United States Patent
Flexman et al.

(10) Patent No.: US 7,381,772 B2
(45) Date of Patent: *Jun. 3, 2008

(54) TOUGHENED POLY(LACTIC ACID) COMPOSITIONS

(75) Inventors: Edmund Arthur Flexman, Wilmington, DE (US); Julius Uradnisheck, Glen Mills, PA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 83 days.

This patent is subject to a terminal disclaimer.

(21) Appl. No.: 11/395,422

(22) Filed: Mar. 31, 2006

(65) Prior Publication Data

US 2006/0173133 A1 Aug. 3, 2006

Related U.S. Application Data

(63) Continuation-in-part of application No. 10/996,899, filed on Nov. 23, 2004.

(60) Provisional application No. 60/529,208, filed on Dec. 12, 2003.

(51) Int. Cl.
*C08L 59/00* (2006.01)

(52) U.S. Cl. ..................... 525/163; 525/162; 525/166; 525/191; 525/176; 525/417; 525/419

(58) Field of Classification Search ............... 525/163, 525/166, 191, 176, 417, 419, 162
See application file for complete search history.

(56) References Cited

U.S. PATENT DOCUMENTS

| 3,264,272 | A | 8/1966 | Rees |
| 4,187,358 | A | 2/1980 | Kyo |
| 4,753,980 | A | 6/1988 | Deyrup |
| 4,912,167 | A | 3/1990 | Deyrup |
| 5,498,650 | A | 3/1996 | Flexman |
| 6,943,214 | B2 | 9/2005 | Flexman |
| 2004/0242803 | A1 | 12/2004 | Ohme |
| 2005/0151296 | A1 | 7/2005 | Obuchi |

FOREIGN PATENT DOCUMENTS

| WO | WO 0023520 A1 | 4/2000 |
| WO | WO 03014224 A1 | 2/2003 |
| WO | WO 03082980 A1 | 10/2003 |
| WO | WO 2004101642 A1 | 11/2005 |

*Primary Examiner*—Randy Gulakowski
*Assistant Examiner*—Olga Asinovsky

(57) ABSTRACT

Toughened poly(lactic acid) resin compositions comprising poly(lactic acid) and an impact modifier comprising an ethylene copolymer made from monomers (a) ethylene; (b) one or more olefins of the formula $CH_2=C(R^1)CO_2R^2$, where $R^1$ is hydrogen or an alkyl group with 2-8 carbon atoms and $R^2$ is an alkyl group with 1-8 carbon atoms, such as methyl, ethyl, or butyl; and (c) one or more olefins of the formula $CH_2=C(R^3)CO_2R^4$, where $R^3$ is hydrogen or an alkyl group with 1-6 carbon atoms, such as methyl, and $R^4$ is glycidyl. The ethylene copolymer may further be made from carbon monoxide monomers. The compositions may further comprise one or more ethylene/acrylate and/or ethylene/vinyl ester polymers, ionomers, and cationic grafting agents.

20 Claims, No Drawings

TOUGHENED POLY(LACTIC ACID) COMPOSITIONS

This application is a continuation-in-part of U.S. application Ser. No. 10/996,899, filed Nov. 23, 2004, which claims the benefit of U.S. Provisional Application No. 60/529,208, filed Dec. 12, 2003. The entire disclosures of both parent applications are herein incorporated by reference.

The invention relates to thermoplastic poly(lactic acid) compositions toughened with a random ethylene copolymer comprising glycidyl groups. The compositions may further comprise one or more of ethylene/acrylate polymers, ionomers, and/or grafting catalysts.

BACKGROUND OF THE INVENTION

Poly(lactic acid) (PLA) can be derived biologically from naturally occurring sources other than petroleum and is biodegradable. However, physical limitations such as brittleness and slow crystallization may prevent easy injection molding of PLA into articles that have an acceptable degree of toughness for many applications. Extruded amorphous sheeting may also be too brittle for handling in continuous moving equipment without breakage.

It is desirable in the present invention to obtain a toughener for poly(lactic acid) that allows poly(lactic acid) compositions to be easily melt-processed into a variety of articles with an acceptable level of toughness.

Japanese patent application publication H9-316310 discloses a poly(lactic acid) resin composition comprising PLA and modified olefin compounds. Examples of those modified olefin compounds are ethylene-glycidyl methacrylate copolymers grafted with polystyrene, poly(dimethyl methacrylate), etc. and copolymers of ethylene and alpha-olefins grafted with maleic anhydride and maleimide.

SUMMARY OF THE INVENTION

The invention provides a poly(lactic acid) composition comprising (i) about 60 to about 99.5 or about 60 to about 97 weight % poly(lactic acid) and (ii) about 0.5 to about 40 weight % of an impact modifier comprising an ethylene copolymer derived from copolymerizing (a) about 20 to about 95 weight % ethylene, (b) about 3 to about 70 weight % of one or more olefins of the formula $CH_2=C(R^1)CO_2R^2$, (c) about 0.5 to about 25 weight % of one or more olefins of the formula $H_2=C(R^3)CO_2R^4$, and optionally (d) 0 to about 20 weight % carbon monoxide where $R^1$ is hydrogen or an alkyl group with 1-8 carbon atoms, $R^2$ is an alkyl group with 1-8 carbon atoms, where $R^3$ is hydrogen or an alkyl group with 1-6 carbon atoms, $R^4$ is glycidyl, the weight % of the poly(lactic acid) and the impact modifier are based on the total weight of the poly(lactic acid) and the impact modifier, and the weight % of ethylene, $CH_2=C(R^1)CO_2R^2$, or $H_2=C(R^3)CO_2R^4$ is based on the modifier or copolymer weight.

DETAILED DESCRIPTION OF THE INVENTION

The present invention is a toughened thermoplastic composition comprising poly(lactic acid) and an impact modifier. The impact modifier may comprise a random ethylene copolymer and, optionally, other tougheners.

As used in the present invention, the term "poly(lactic acid)" ("PLA") refers to poly(lactic acid) homopolymers and copolymers of lactic acid and other monomers containing at least 50 mole % of repeat units derived from lactic acid or its derivatives and mixtures thereof having a number average molecular weight of 3,000-1,000,000, 10,000-700,000, or 20,000-600,000. The poly(lactic acid) used in the present invention may contain at least 70 mole % of repeat units derived from (e.g. made by) lactic acid or its derivatives. The poly(lactic acid) homopolymers and copolymers used in the present invention can be derived from d-lactic acid, l-lactic acid, or a mixture thereof. A mixture of two or more poly(lactic acid) polymers can be used. Poly(lactic acid) is typically prepared by the catalyzed ring-opening polymerization of the dimeric cyclic ester of lactic acid, which is referred to as "lactide." As a result, poly(lactic acid) is also referred to as "polylactide." Poly(lactic acid) may also be made by living organisms such as bacteria or isolated from plant matter that include corn, sweet potatoes, and the like. Poly(lactic acid) made by such living organisms may have higher molecular weights than those made synthetically.

Copolymers of lactic acid are typically prepared by catalyzed copolymerization of lactide or another lactic acid derivative with one or more cyclic esters and/or dimeric cyclic esters. Typical comonomers are glycolide (1,4-dioxane-2,5-dione), the dimeric cyclic ester of glycolic acid; $\alpha,\alpha$-dimethyl-$\beta$-propiolactone, the cyclic ester of 2,2-dimethyl-3-hydroxypropanoic acid; $\beta$-butyrolactone, the cyclic ester of 3-hydroxybutyric acid, $\delta$-valerolactone, the cyclic ester of 5-hydroxypentanoic acid; $\epsilon$-caprolactone, the cyclic ester of 6-hydroxyhexanoic acid, and the lactone of its methyl substituted derivatives, such as 2-methyl-6-hydroxyhexanoic acid, 3-methyl-6-hydroxyhexanoic acid, 4-methyl-6-hydroxyhexanoic acid, 3,3,5-trimethyl-6-hydroxyhexanoic acid, etc., the cyclic ester of 12-hydroxydodecanoic acid, and 2-p-dioxanone, the cyclic ester of 2-(2-hydroxyethyl)-glycolic acid. Aliphatic and aromatic diacid and diol monomers such as succinic acid, adipic acid, and terephthalic acid and ethylene glycol, 1,3-propanediol, and 1,4-butanediol may also be used. Copolymers may also be made by living organisms or isolated from plant matter as described above. The PLA may comprise from about 60 to about 99.5 weight %, about 60 to about 97 weight %, about 70 to 95 weight %, or about 80 to about 90 weight % of the composition of the present invention, based on the total amount of PLA and impact modifier used.

As used herein, the term "ethylene copolymer" refers to a polymer derived from (e.g. made from) ethylene and at least one or two additional monomers.

The impact modifier can be present in the composition from about 0.5 to about 40, about 3 to about 40, about 0.5 to about 30, about 0.2 to about 20, about 0.5 to about 15, about 0.5 to about 3, about 1 to about 15, about 1 to about 10, or about 1 to about 5, weight %.

The ethylene copolymer impact modifier used in the present invention is at least one random polymer made by polymerizing monomers (a) ethylene; (b) one or more olefins of the formula $CH_2=C(R^1)CO_2R^2$, where $R^1$ is hydrogen or an alkyl group with 1-8 carbon atoms and $R^2$ is an alkyl group with 1-8 carbon atoms, such as methyl, ethyl, or butyl; and (c) one or more olefins of the formula $CH_2=C(R^3)CO_2R^4$, where $R^3$ is hydrogen or an alkyl group with 1-6 carbon atoms, such as methyl, and $R^4$ is glycidyl. Monomers (b) can be butyl acrylates. One or more of n-butyl acrylate, tert-butyl acrylate, iso-butyl acrylate, and sec-butyl acrylate may be used. An example of ethylene copolymer is derived from ethylene, butyl acrylate, and glycidyl methacrylate and referred to as EBAGMA. Repeat units derived from monomer (a) may comprise about 20 to about 95 weight %, about 20 to about 90 weight %, about 40 to about 90 weight %, or about 50 to 80 weight % of the of the total weight of the ethylene copolymer. Repeat units derived from monomer (b) may comprise about 3 to about 70 weight %, about 3 to about 40 weight %, about 15 to about 35 weight %, or about 20 to about 35 weight % of the total weight of the ethylene copolymer. Repeat units derived from monomer (c) may comprise about 0.5 to about 25 weight %, about 2 to about 20 weight %, or about 3 to about 17 weight % of the total weight of the ethylene copolymer.

The ethylene copolymer derived from the monomers (a)-(c) above may additionally be derived from (d) carbon monoxide (CO) monomers. When present, repeat units derived from carbon monoxide may comprise up to about 20 weight % or about 3 to about 15 weight % of the total weight of the ethylene copolymer.

The ethylene copolymers used in the composition of the present invention are random copolymers that can be prepared by direct polymerization of the foregoing monomers in the presence of a free-radical polymerization initiator at elevated temperatures, about 100 to about 270° C. or about 130 to about 230° C., and at elevated pressures, at least about 70 MPa or about 140 to about 350 MPa. The ethylene copolymers may also be prepared using a tubular process, an autoclave, or a combination thereof, or other suitable processes. The ethylene copolymers may be not fully uniform in repeat unit composition throughout the polymer chain due to imperfect mixing during polymerization or variable monomer concentrations during the course of the polymerization. The ethylene copolymers are not grafted or otherwise modified post-polymerization.

The impact modifier used in the present invention may further comprise one or more copolymers of ethylene and an acrylate ester such ethyl acrylate or butyl acrylate or a vinyl ester such as vinyl acetate in up to about 90 weight %, alternatively up to about 75 weight %, based on the total weight of the impact modifier. For example, an ethylene alkyl acylate copolymer, such as an ethylene/methyl acrylate copolymer, may be present in from about 1 to about 90 weight %, about 5 to about 75 weight %, or about 10 to about 50 weight %, based on the total weight of the impact modifier. When used, the copolymers of ethylene and an acrylate ester or vinyl acetate may be present in about 1 to about 50 weight %, about 5 to about 40 weight %, or about 10 to about 30 weight %, based on the total weight of the impact modifier.

The impact modifier used in the present invention may further comprise at least one optional ionomer toughening agent. By an ionomer is meant a carboxyl group containing polymer that has been neutralized or partially neutralized with metal cations such as zinc, manganese(II), magnesium, cadmium, tin(II), cobalt(II), antimony(II), or sodium, or lithium and the like. Examples of ionomers are described in U.S. Pat. Nos. 3,264,272 and 4,187,358. Examples of suitable carboxyl group containing polymers include, but are not limited to, ethylene/acrylic acid copolymers and ethylene/methacrylic acid copolymers. The carboxyl group containing polymers may also be derived from one or more additional monomer, such as, but not limited to, butyl acrylate. Zinc salts can be neutralizing agents. Ionomers are commercially available under the Surlyn® trademark from E.I. du Pont de Nemours and Company, Wilmington, Del. When used, the ionomers may be present in about 1 to about 75 weight %, about 5 to about 60 weight %, or about 10 to about 50 weight %, based on the total weight of the impact modifier.

The composition of the present invention may further comprise at least one optional grafting catalyst. Grafting catalysts are described in U.S. Pat. No. 4,912,167. The grafting catalyst is a source of catalytic cations such as $Al^{3+}$, $Cd^{2+}$, $Co^{2+}$, $Cu^{2+}$, $Fe^{2+}$, $In^{3+}$, $Mn^{2+}$, $Nd^{3+}$, $Sb^{3+}$, $Sn^{2+}$, and $Zn^{2+}$. Suitable grafting catalysts include, but are not limited to, salts of hydrocarbon mono-, di-, or polycarboxylic acids, such as acetic acid and stearic acid. Inorganic salts such as carbonates may also be used. Examples of grafting catalysts include, but are not limited to, stannous octanoate, zinc stearate, zinc carbonate, and zinc diacetate (hydrated or anhydrous). When used the grafting catalyst may comprise about 0.01 to about 3 parts by weight per hundred parts by weight of poly(lactic acid) and impact modifier.

The compositions of the present invention may also optionally further comprise other additives such as about 0.5 to about 5 weight % plasticizer; about 0.1 to about 5 weight % antioxidants and stabilizers; about 3 to about 40 weight % fillers; about 5 to about 40 weight % reinforcing agents; about 0.5 to about 10 weight % nanocomposite reinforcing agents; and/or about 1 to about 40 weight % flame retardants. Examples of suitable fillers include glass fibers and minerals such as precipitated $CaCO_3$, talc, and wollastonite.

In an embodiment of the present invention, the composition is prepared by melt blending the poly(lactic acid) and ethylene copolymer until they are homogeneously dispersed to the naked eye and do not delaminate upon injection molding. Other materials (e.g. ethylene-acrylate copolymers, ionomers, grafting agents, and other additives) may be also uniformly dispersed in the poly(lactic acid)-ethylene copolymer matrix. The blend may be obtained by combining the component materials using any melt-mixing method known in the art. For example: 1) the component materials may be mixed to homogeneity using a melt-mixer such as a single or twin-screw extruder, blender, kneader, Banbury mixer, roll mixer, etc. to give a resin composition; or 2) a portion of the component materials can be mixed in a melt-mixer, and the rest of the component materials subsequently added and further melt-mixed until homogeneous.

Also disclosed is an article comprising or producing from the composition disclosed herein. The composition may be molded into articles using any suitable melt-processing technique. Commonly used melt-molding methods known in the art such as injection molding, extrusion molding, or blow molding. The compositions of the present invention may be formed into films and sheets by extrusion to prepare both cast and blown films. These sheets may be further thermoformed into articles and structures that may be oriented from the melt or at a later stage in the processing of the composition. The compositions of the present invention may also be used to form fibers and filaments that may be oriented from the melt or at a later stage in the processing of the composition. Examples of articles that may be formed from the compositions of the present invention include, but are not limited to, knobs, buttons, disposable eating utensils, films, thermoformable sheeting and the like. Parisons used in blow molding containers may be prepared by injection molding. Blow molded containers include bottles, jars and the like. Films and sheets can be used to prepare packaging materials and containers such as pouches, lidding, thermoformed containers such as trays, cups, and bowls. Other thermoformed packaging articles include blister packaging, blister components or pharmaceutical compartments for dispensers, clam shells, handling-trays, point-of-purchase display stands, two-pieces boxes (lid and base combinations), dispenser bodies, bifoldable articles, and the like.

EXAMPLES

Compounding: The compositions of the examples were prepared by compounding in a 28 mm or 30 mm co-rotating Werner & Pfleiderer twin screw extruder with a screw design comprising two hard working segments followed by a vacuum port and twin hole die. The molten material was discharged into a water quench tank prior to being cut by a strand cutter.

Molding: Molding was done on a 6-ounce reciprocating screw molding machine into an ASTM mold that made a single 1/8" tensile bar and two 5" ×1/8" flexural bars using a screw speed of 60 rpm, a fast injection rate, and a back pressure of 50 psi.

Notched Izod impact strength measurements were made according to ASTM D256. Each 1/8" flexural bar was cut in half and each half was notched in the middle and tested.

Materials Used: PLA-1 used in the following examples was a poly(lactic acid) homopolymer with an inherent viscosity of 1.49 as measured in 1:1 TFA/methylene chloride at 0.4 g/decaliter at 23° C. It contains minor amounts of normal commercial additives. PLA-2 is a poly(lactic acid) with a melting point of about 165° C. available as NATUREWORKS LLC 3001D.

EBAGMA-5 was an ethylene/n-butyl acrylate/glycidyl methacrylate terpolymer derived from 66.75 weight % ethylene, 28 weight % n-butyl acrylate, and 5.25 weight % glycidyl methacrylate. It had a melt index of 12 g/10 minutes as measured by ASTM method D1238.

EBAGMA-12 was an ethylene/n-butyl acrylate/glycidyl methacrylate terpolymer derived from 66 weight % ethylene, 22 weight % n-butyl acrylate, and 12 weight % glycidyl methacrylate. It had a melt index of 8 g/10 minutes as measured by ASTM method D1238.

EBAGMA-17 was an ethylene/n-butyl acrylate/glycidyl methacrylate terpolymer derived from 63 weight % ethylene, 20 weight % n-butyl acrylate, and 17 weight % glycidyl methacrylate. It had a melt index of 15 g/10 minutes as measured by ASTM method D1238.

E/GMA was an ethylene/glycidyl methacrylate copolymer derived from 98.2 weight % ethylene and 1.8 weight % glycidyl methacrylate.

E/BA was an ethylene/butyl acrylate copolymer derived from 27 weight % butyl acrylate and 73 weight % ethylene.

EPDM was a polymer derived from 68 weight % ethylene, 28 weight % propylene, and 4 weight % 1,3-hexadiene and having a Mooney viscosity $ML_4$ at 250° C. of 35.

EVA was an ethylene/vinyl acetate dipolymer derived from 60 weight % ethylene and 40 weight % vinyl acetate and having a melt index of 4.0 at 190° C. with a weight of 2.16 kg.

Ionomer-1 was a terpolymer derived from 67 weight % ethylene, 24 weight % n-butyl acrylate, and 9 weight % methacrylic acid and that had been 35% neutralized with zinc.

Ionomer-2 was a dipolymer derived from 89.5 weight % ethylene and 10.5 weight % methacrylic acid that has been 71% neutralized with zinc and having a melt index of 1.1 at 190° C. with a weight of 2.16 kg.

E/MA was an ethylene/methyl acrylate copolymer derived from 24 weight % methyl acrylate and 76 weight % ethylene having a melt flow of 2.0 at 190° C. with a weight of 2.16 kg. $SnOct_2$ was stannous octanoate.

The ingredient quantities in Tables 1 through 4 are given in weight % based on the total weight of the composition.

COMPARATIVE EXAMPLES 1-5

Each of the materials for each Comparative Example shown in Table 1 was compounded in a twin screw extruder with the barrels and die set to about 190° C. at 200 rpm and about 30 to about 40 pounds per hour. The melt temperatures were about 225-232° C. The resulting compositions were molded into ASTM test bars and their notched Izod impact resistance was determined.

TABLE 1

|  | Comp. Ex. 1 | Comp. Ex. 2 | Comp. Ex. 3 | Comp. Ex. 4 | Comp. Ex. 5 |
| --- | --- | --- | --- | --- | --- |
| PLA-1 | 100 | 80 | 80 | 80 | 80 |
| E/GMA | — | 20 | — | 10 | — |
| E/BA | — | — | 20 | — | — |
| EPDM | — | — | — | 10 | — |
| Ionomer-1 | — | — | — | — | 20 |
| Notched Izod (J/m) | 31.0 | 56.6 | 68.4 | 58.2 | 79 |

Examples 1-7

Each of the materials for each Comparative Example shown in Table 1 was compounded in a twin screw extruder with the barrels and die set to about 170° C. at 150 rpm and about 25 pounds per hour. The melt temperatures were about 205-228° C. The resulting compositions were molded into ASTM test bars and their notched Izod impact resistance was determined.

TABLE 2

|  | Ex. 1 | Ex. 2 | Ex. 3 | Ex. 4 | Ex. 5 | Ex. 6 | Ex. 7 |
| --- | --- | --- | --- | --- | --- | --- | --- |
| PLA-1 | 95 | 90 | 80 | 80 | 80 | 70 | 60 |
| EBAGMA-17 | 5 | 10 | — | — | 20 | 30 | 40 |
| EBAGMA-5 | — | — | 20 | — | — | — | — |
| EBAGMA-12 | — | — | — | 20 | — | — | — |
| Notched Izod (J/m) | 39.5 | 51.8 | 122.8 | 154.9 | 176.2 | 752.9 | 619.4 |

Examples 8-12

Each of the materials for each Example shown in Table 3 was compounded in a twin screw extruder. The barrels and die were set to about 170° C. in the case of Examples 8 and 9 and about 180° C. in the case of Examples 10-12. The extruder operated at about 150 rpm in the case of Examples 8 and 9 and about 200 rpm in the case of Examples 10-12. Example 8 was run at about 30 pounds per hour, Example 9 at about 40 pounds per hour, Example 10 at about 30 pounds per hour, and Examples 11 and 12 at about 50 pounds per hour. The resulting compositions were molded into ASTM test bars and their notched Izod impact resistance was determined.

TABLE 3

|  | Ex. 8 | Ex. 9 | Ex. 10 | Ex. 11 | Ex. 12 |
|---|---|---|---|---|---|
| PLA-1 | 80 | 80 | 80 | 90 | 80 |
| EBAGMA-17 | 10 | 10 | 20 | — | — |
| EBAGMA-12 | — | — | — | 10 | 20 |
| EVA | 10 | — | — | — | — |
| Ionomer-1 | — | 10 | — | — | — |
| SnOct$_2$ | — | — | 0.001 | 0.001 | 0.001 |
| Notched Izod (J/m) | 154.9 | 1388.4 | 400.5 | 57.7 | 102.5 |

Examples 13-20

The compositions for the Examples shown in Table 4 were melt blended using a Werner and Pfleiderer 28D mm twin screw extruder and cast sheets were prepared. The screw design was 780 mm long with a vent port above the 550-mm position. The screw used forward conveying elements except prior to the vent port the screw used 45 mm of kneading blocks, 114 mm of reverse elements, 30 mm of kneading blocks, and 135 mm of reverse elements under the vacuum port. The melt fed though a 25.4-cm wide flat die having a 635-micron die-gap. The melt curtain dropped about 12-cm to a chrome-plated casting drum controlled to 11° C.

The extrusion process was run at 125 rpm, barrel set points at 190° C., and the melt temperature was about 210° C. The quench drum was run at such a speed such that the amorphous cast sheet was about 380-micron thick.

In an off-line operation some of the amorphous cast sheets were converted to semi-crystalline sheets by heating them, unconstrained, in an oven at 107° C. for at least 4 hours.

Toughness of the amorphous and semi-crystalline sheets was assessed using the Spencer Impact Test, ASTM Standard D 3420, using probe #6400.

TABLE 4

|  | Comp. Ex. 6 | Ex. 13 | Ex. 14 | Ex. 15 | Ex. 16 | Ex. 17 | Ex. 18 | Ex. 19 | Ex. 20 |
|---|---|---|---|---|---|---|---|---|---|
| PLA-2 | 100 | 99 | 95 | 83 | 99 | 95 | 91 | 95.2 | 94.7 |
| EBAGMA-5 | — | 1 | 5 | 17 | — | — | — | — | — |
| EBAGMA-12 | — | — | — | — | 1 | 5 | 9 | 1.9 | 4.7 |
| E/MA | — | — | — | — | — | — | — | 2.9 | — |
| Ionomer-2 | — | — | — | — | — | — | — | — | 0.6 |
| Amorphous Spencer Impact (g/mm) | 1500 | 2250 | 2900 | 17600 | 1740 | 3100 | 11000 | 3600 | 4300 |
| Semi-crystalline Spencer Impact (g/mm) | 3900 | 6100 | 8100 | 9500 | 4300 | 11600 | 13000 | 9900 | 11400 |

In addition to improved impact resistance, the toughened PLA compositions described herein exhibit improved tear resistance and improved flex fatigue. The sheets prepared from the compositions exhibit good clarity.

It is therefore, apparent that there has been provided in accordance with the present invention, a toughened poly (lactic acid) composition that fully satisfies the aims and advantages hereinbefore set forth. While this invention has been described in conjunction with a specific embodiment thereof, it is evident that many alternatives, modifications, and variations may be apparent to those skilled in the art. Accordingly, it is intended to embrace all such alternatives, modifications and variations that fall within the spirit and broad scope of the appended claims.

The invention claimed is:

1. A poly(lactic acid) composition comprising
   (i) about 60 to about 99.5 weight % poly(lactic acid), and
   (ii) about 0.5 to about 40 weight % of an impact modifier comprising an ethylene copolymer derived from copolymerizing:
      (a) about 20 to about 95 weight % ethylene;
      (b) about 3 to about 70 weight % of one or more olefins of the formula $CH_2=C(R^1)CO_2R^2$, where $R^1$ is hydrogen or an alkyl group with 1-8 carbon atoms and $R^2$ is an alkyl group with 1-8 carbon atoms; and
      (c) about 0.5 to about 25 weight % of one or more olefins of the formula $CH_2=C(R^3)CO_2R^4$, where $R^3$ is hydrogen or an alkyl group with 1-6 carbon atoms, and $R^4$ is glycidyl,
   wherein the weight % of the poly(lactic acid) and the impact modifier are based on the total weight of the poly(lactic acid) and the impact modifier.

2. The composition of claim 1, wherein the impact modifier is present in the composition in about 0.2 to about 20 weight %.

3. The composition of claim 1, wherein the impact modifier is present in the composition in about 0.5 to about 3 weight %.

4. The composition of claim 1, wherein (a) is about 40 to about 90 weight % ethylene.

5. The composition of claim 1, wherein (a) is about 50 to about 80 weight % ethylene.

6. The composition of claim 1, wherein (b) is about 20 to about 35 weight % of one or more olefins of the formula $CH_2=C(R^1)CO_2R^2$, where $R^1$ is hydrogen or an alkyl group with 1-8 carbon atoms and $R^2$ is an alkyl group with 1-8 carbon atoms.

7. The composition of claim 1, wherein (c) is about 3 to about 17 weight % of at least one olefin of the formula $CH_2=C(R^3)CO_2R^4$, where $R^3$ is hydrogen or an alkyl group with 1-6 carbon atoms, and $R^4$ is glycidyl.

8. The composition of claim 1, wherein the ethylene copolymer is further derived from copolymerizing (d) 0 to about 20 weight % carbon monoxide.

9. The composition of claim 1 wherein (b) is butyl acrylate and (c) is glycidyl methacrylate.

10. The composition of claim 1 wherein the impact modifier (ii) further comprises about 1 to about 75 weight % of one or more ionomers, based on the total weight of the impact modifier.

11. The composition of claim 1, wherein the impact modifier (ii) further comprises 10 to 50 weight % of one or more ionomers, based on the total weight of the impact modifier.

12. The composition of claim 1, wherein the impact modifier (ii) further comprises up to about 90 weight % of one or more copolymers of ethylene and an acrylate ester or vinyl acetate, based on the total weight of the impact modifier.

13. The composition of claim 1, wherein the impact modifier (ii) further comprises up to about 75 weight % of one or more copolymers of ethylene and an acrylate ester or vinyl acetate, based on the total weight of the impact modifier.

14. The composition of claim 1, wherein the impact modifier (ii) further comprises up to about 50 weight % of one or more copolymers of ethylene and an acrylate ester or vinyl acetate, based on the total weight of the impact modifier.

15. The composition of claim 1, further comprising one or more cationic grafting catalysts.

16. The composition of claim 12, wherein the cationic grafting catalysts are selected from the group consisting of salts of hydrocarbon mono-, di-, or polycarboxylic acids.

17. The composition of claim 12 wherein the cationic grafting catalysts are one or more of stannous octanoate, zinc stearate, and zinc diacetate.

18. A molded article comprising the composition of claim 1.

19. An extruded article comprising the composition of claim 1.

20. A thermoformed article comprising the composition of claim 1.

* * * * *